(12) United States Patent
Gherman et al.

(10) Patent No.: US 9,750,373 B2
(45) Date of Patent: Sep. 5, 2017

(54) HIGH-SPEED BLENDING BLADE FOR A FOOD PROCESSING APPLIANCE

(71) Applicant: Whirlpool Corporation, Benton Harbor, MI (US)

(72) Inventors: Romulus Alexandru Gherman, Chicago, IL (US); Timothy J. Laroy, Kalamazoo, MI (US); Joseph Q. Marietta, Kalamazoo, MI (US); Edith M. Wine, Pittsburgh, PA (US)

(73) Assignee: Whirlpool Corporation, Benton Harbor, MI (US)

( * ) Notice: Subject to any disclaimer, the term of this patent is extended or adjusted under 35 U.S.C. 154(b) by 483 days.

(21) Appl. No.: 14/538,064

(22) Filed: Nov. 11, 2014

(65) Prior Publication Data

US 2016/0128516 A1     May 12, 2016

(51) Int. Cl.
    *A47J 43/07*             (2006.01)

(52) U.S. Cl.
    CPC .................................. *A47J 43/0722* (2013.01)

(58) Field of Classification Search
    CPC ................................................... A47J 43/0722
    USPC ..................... 366/205, 314; 241/282.1, 282.2
    See application file for complete search history.

(56) References Cited

U.S. PATENT DOCUMENTS

| | | | |
|---|---|---|---|
| 3,368,800 A | * | 2/1968 | Barnard ................. A47J 43/046 241/282.2 |
| 3,380,499 A | * | 4/1968 | Vocci et al. ............. B02C 18/12 241/191 |
| 3,856,220 A | | 12/1974 | Waters |
| 6,092,922 A | | 7/2000 | Kett et al. |
| 6,609,821 B2 | | 8/2003 | Wulf et al. |
| 6,632,013 B2 | | 10/2003 | Wulf et al. |
| 6,666,574 B1 | | 12/2003 | Pryor |
| 6,834,818 B2 | | 12/2004 | Lee |
| 6,960,015 B2 | | 11/2005 | Lee |
| 6,974,099 B2 | | 12/2005 | Kolar et al. |
| D513,685 S | | 1/2006 | Katz et al. |
| 7,278,598 B2 | | 10/2007 | Katz et al. |
| 7,371,004 B1 | | 5/2008 | Branson, III et al. |
| 7,520,659 B2 | | 4/2009 | Wulf et al. |
| 7,552,885 B2 | | 6/2009 | Katz et al. |
| 7,632,007 B2 | | 12/2009 | Wulf et al. |
| 7,641,380 B2 | | 1/2010 | Behar et al. |

(Continued)

FOREIGN PATENT DOCUMENTS

| | | |
|---|---|---|
| EP | 2486833 A1 | 8/2012 |
| GB | 2328145 A | 2/1999 |

(Continued)

*Primary Examiner* — David Sorkin
(74) *Attorney, Agent, or Firm* — Price Heneveld LLP

(57) ABSTRACT

A high-speed blending blade for a food-processing appliance includes two opposing upwardly arcuate blades, wherein each of the upwardly arcuate blades defines a continuously-curved downward top surface, two opposing downwardly arcuate blades, wherein each of the downwardly arcuate blades defines a continuously-curved upward top surface, a central blade portion having a central top surface, wherein the top central surface is co-planar with a portion of each downward top surface and each upward top surface and a pair of opposing top blades extending at a predetermined angle from proximate the central top surface.

20 Claims, 14 Drawing Sheets

(56) References Cited

U.S. PATENT DOCUMENTS

| | | |
|---|---|---|
| 7,841,764 B2 | 11/2010 | Wulf et al. |
| 8,056,848 B1 | 11/2011 | Liang |
| 8,251,573 B2 | 8/2012 | Chou |
| 8,444,076 B2 | 5/2013 | Rukavina |
| D684,817 S | 6/2013 | Leavitt |
| D700,013 S | 2/2014 | Chu |
| 8,690,093 B2 | 4/2014 | Rukavina |
| 2009/0114616 A1 | 5/2009 | White et al. |
| 2009/0260236 A1 | 10/2009 | Lin |
| 2012/0199682 A1 | 8/2012 | Lee et al. |

FOREIGN PATENT DOCUMENTS

| | | |
|---|---|---|
| GB | 2506394 A | 4/2014 |
| WO | 9322042 A1 | 11/1993 |
| WO | 2004103538 A2 | 12/2004 |
| WO | 2007028198 A1 | 3/2007 |
| WO | 2008101148 A1 | 8/2008 |
| WO | 2012044306 A1 | 4/2012 |
| WO | 2013120145 A1 | 8/2013 |

* cited by examiner

US 9,750,373 B2

HIGH-SPEED BLENDING BLADE FOR A FOOD PROCESSING APPLIANCE

BACKGROUND

The present invention generally relates to food processing blades, and more specifically, to high-speed blending blades for food processing appliances.

SUMMARY

In at least one aspect, a high-speed blending blade for a food-processing appliance includes two opposing upwardly arcuate blades. Each of the upwardly arcuate blades defines a continuously-curved downward top surface. The high-speed blending blade also includes two opposing downwardly arcuate blades, wherein each of the downwardly arcuate blades defines a continuously-curved upward top surface. A central blade portion is also included and has a central top surface. The top central surface is complementary with a portion of each downward top surface and each upward top surface. A pair of opposing top blades extends at a predetermined angle from proximate the central top surface.

In at least another aspect, a high-speed blade for a food-processing appliance includes a downward blade portion including first and second blades, wherein each of the first and second blades define a continuous downwardly curved top surface. An upward blade portion includes third and fourth blades, wherein the third and fourth blades define a continuous upwardly curved top surface. A central blade portion receives the upward and downward blade portions. Each continuous downwardly curved top surface and continuous upwardly curved top surface includes a transition portion that engages and is substantially co-planar with a central top surface of the central blade portion. The central blade portion includes a connecting aperture.

In at least another aspect, a high-speed blending blade for a food-processing appliance includes a continuously curved convex blade portion having a thickness of approximately 3 millimeters, a continuously curved concave blade portion having a thickness of approximately 3 millimeters, and a central blade portion that receives the continuously curved convex and concave blade portions. The central blade portion defines a fastening aperture.

These and other features, advantages, and objects of the present device will be further understood and appreciated by those skilled in the art upon studying the following specification, claims, and appended drawings.

DETAILED DESCRIPTION OF EMBODIMENTS

Figure 1:
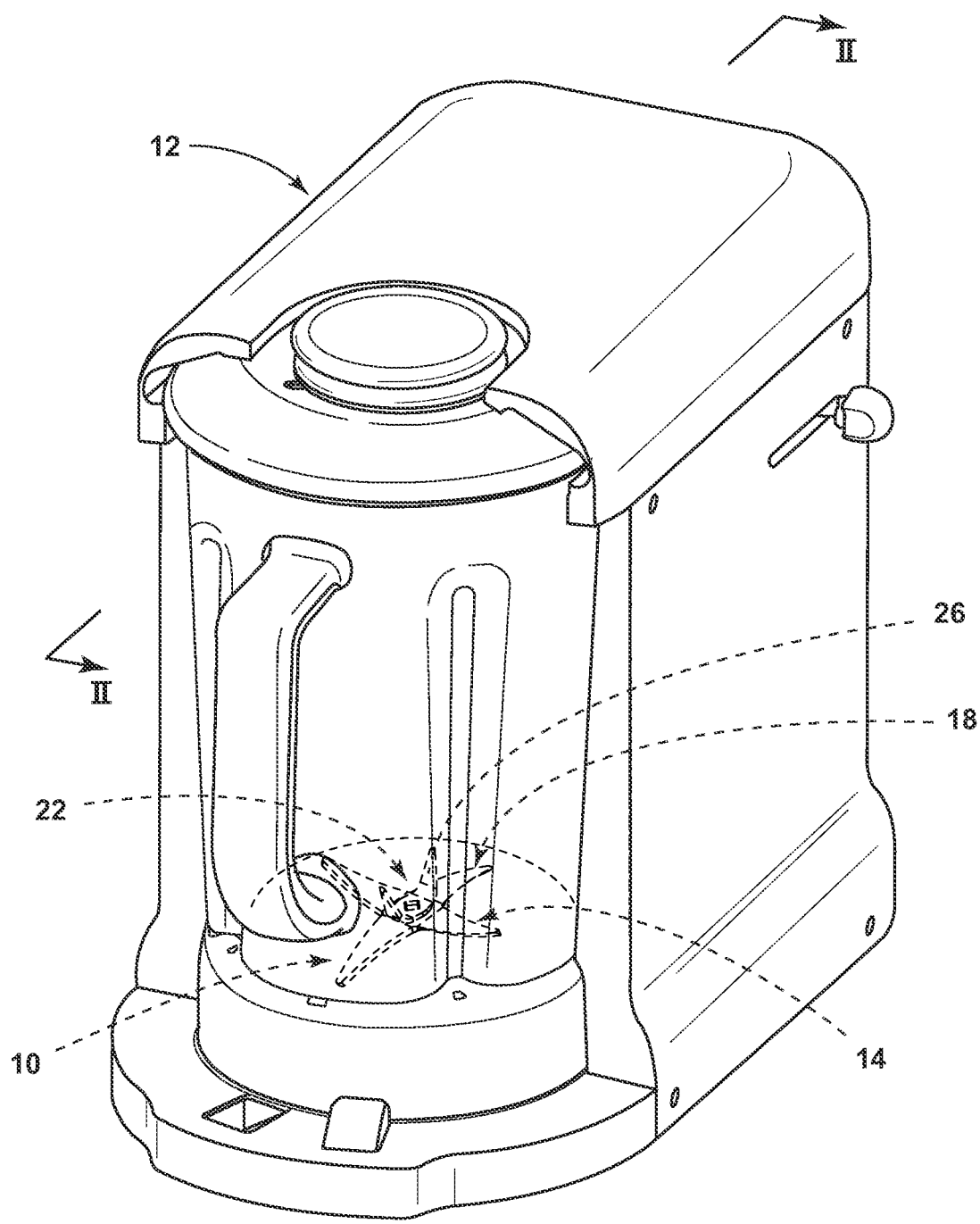
FIG. 1 is a top perspective view of a food processing appliance incorporating an embodiment of a high-speed blending blade.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-11, reference numeral 10 generally refers to a high-speed blending blade for a food processing appliance 12, according to one embodiment. The high-speed blending blade 10 can include two opposing upwardly arcuate blades 14, where each of the upwardly arcuate blades 14 defines a continuously curved upward top surface 16. The high-speed blending blade 10 can also include two opposing downwardly arcuate blades 18, where each of the downwardly arcuate blades 18 includes a continuously curved downward top surface 20. A central blade portion 22 is included within the high-speed blending blade 10 and includes a central top surface 24. The central top surface 24 is complementary with a portion of each upward top surface 16 and each downward top surface 20. A pair of opposing top blades 26 extends a predetermined angle 28 from an area proximate the central top surface 24 of the high-speed blending blade 10.

Figure 2:
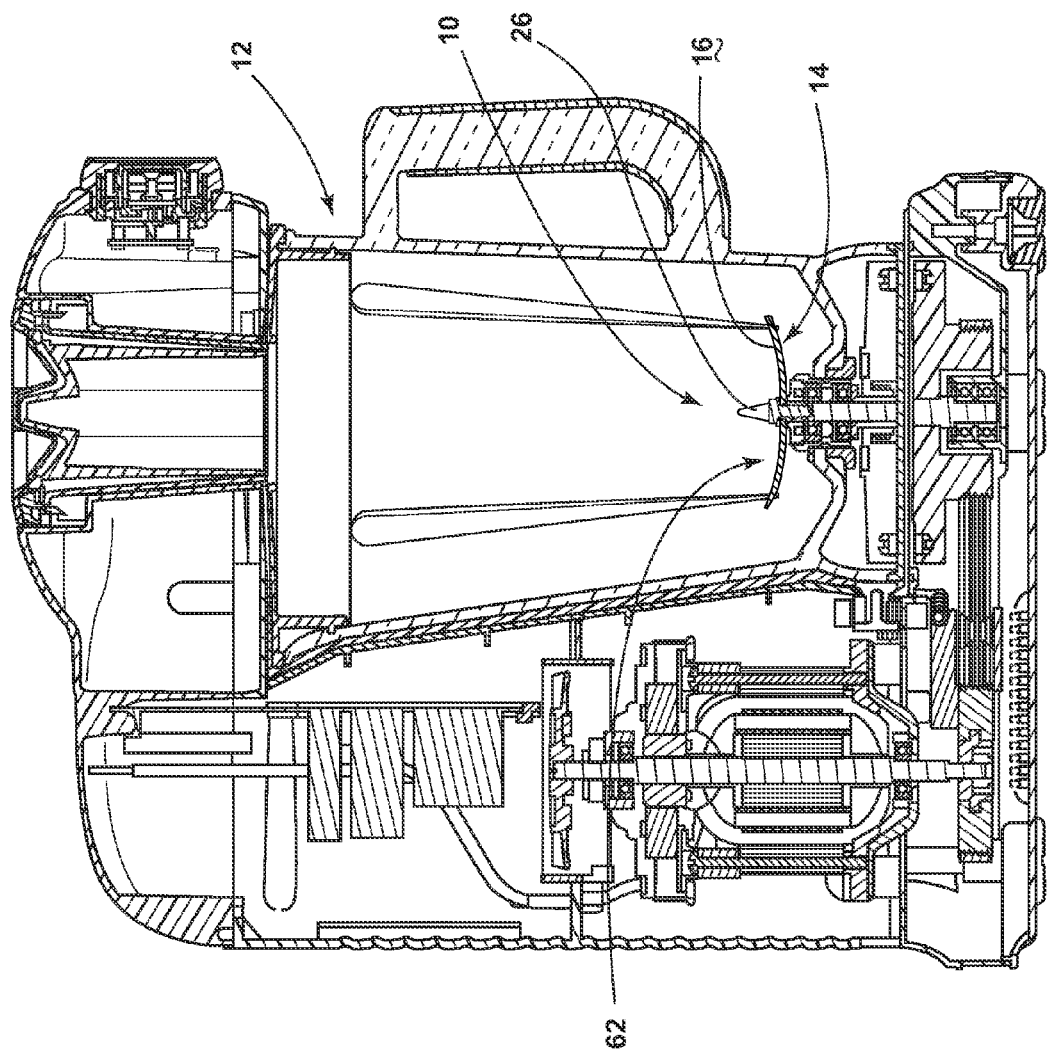
FIG. 2 is a cross-sectional view of the food processing appliance of FIG. 1 taken along line II-II, and the section taken through the upwardly arcuate blades of the high-speed blending blade.
Figure 3:
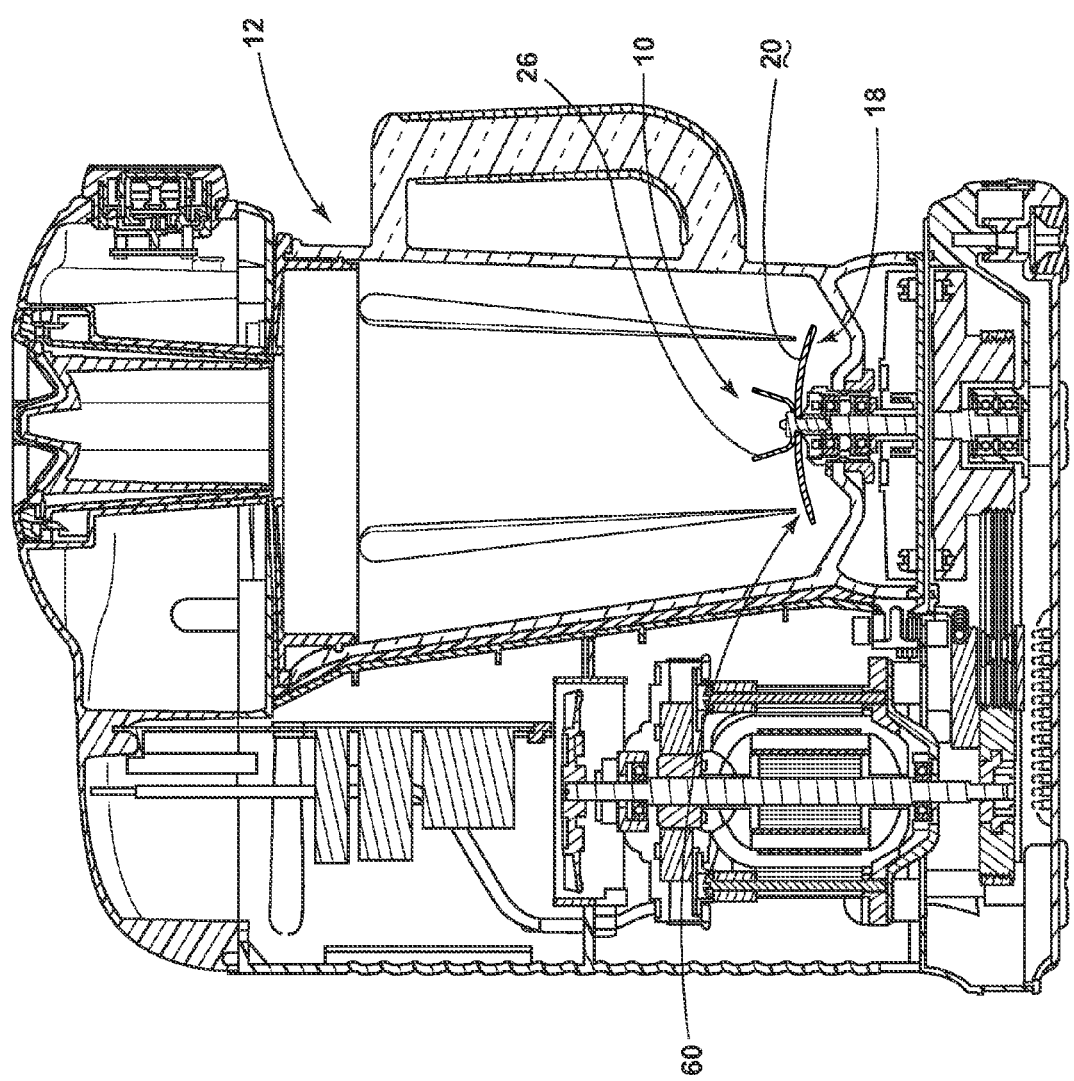
FIG. 3 is a cross-sectional view of the food processing appliance of FIG. 2 with the section taken through the downwardly arcuate blades of the high-speed blending blade.
Figure 4:
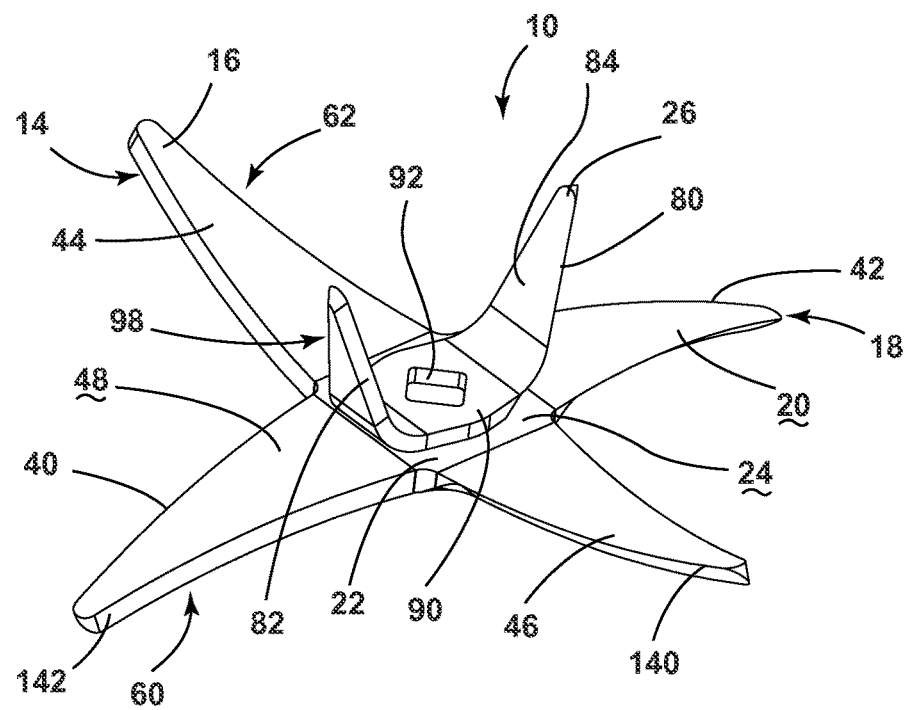
FIG. 4 is a top perspective view of another embodiment of the high-speed blending blade.
Figure 5:
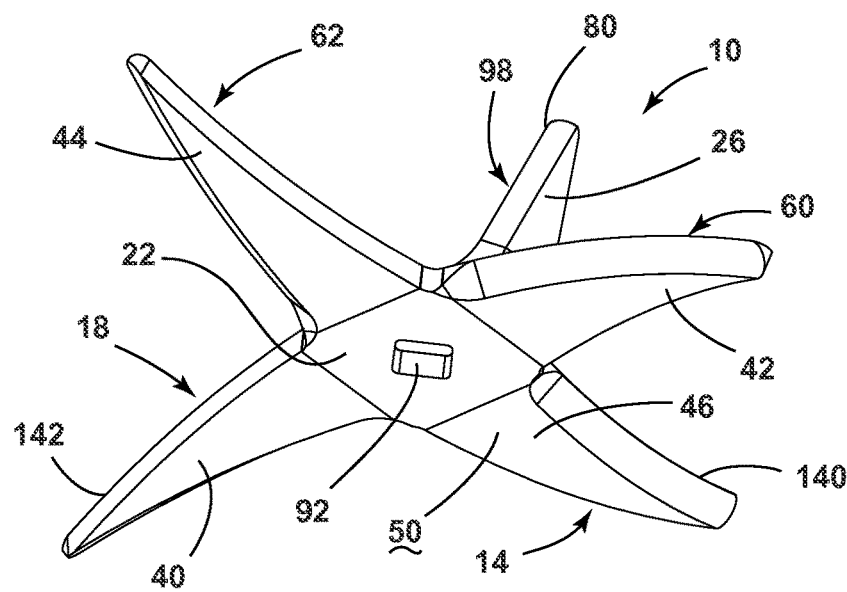
FIG. 5 is a bottom perspective view of the high-speed blending blade of FIG. 4.

Referring again to the embodiment of FIGS. 1-3, the high-speed blending blade 10 is configured to be installed within a high-speed food processing appliance 12 that is capable of rotating the high-speed blending blade 10 from about 20,000 revolutions per minute (RPM), and more typically, about 24,000 RPM and up to about 30,000 RPM or higher. Due to the high-speed rotational capabilities of the food processing appliance 12, the various components of the high-speed blending blade 10 are configured to have a substantially thicker cross section. Accordingly, it is contemplated that each of the upwardly arcuate blades 14, downwardly arcuate blades 18, central blade portion 22 and top blades 26 have a thickness of approximately 3 mm. According to various alternate embodiments, the top blades 26 can have a thickness of approximately 2 mm. The increased thickness of the high-speed blending blade 10 over conventional blending blades provides the high-speed blending blade 10 with a higher fatigue limit to accommodate the high-speed rotation of the food processing appliance 12 when installed therein.

Referring now to the embodiment illustrated in FIGS. 4-11, the two opposing downwardly arcuate blades 18 can include first and second blades 40, 42, where each of the first and second blades 40, 42 defines the continuously curved downward top surface 20. Similarly, the two opposing upwardly arcuate blades 14 can include the third and fourth blades 44, 46, wherein the third and fourth blades 44, 46 define the continuously curved upward top surface 16. The central blade portion 22 that receives the upwardly and downwardly arcuate blades 14, 18 and, in turn, the first, second, third and fourth blades 40, 42, 44, 46, can be a substantially flat surface. Additionally, the substantially flat central top surface 24 of the central blade portion 22 is configured to be co-planar with at least a portion of the curved downward top surface 20 of the first and second blades 40, 42 and the curved upward top surface 16 of the third and fourth blades 44, 46. In this manner, the curvature of the first, second, third and fourth blades 40, 42, 44, 46 is designed to be parallel and co-planar with the top surface 48 of the central blade portion 22 where the first, second, third and fourth blades 40, 42, 44, 46 engage the central blade portion 22. Accordingly, angular contours of the top and bottom surfaces 48, 50 of the high-speed blending blade 10 are minimized. The first, second, third and fourth blades 40, 42, 44, 46 then curve, either downward or upward, respectively, to provide the first, second, third and fourth blades 40, 42, 44, 46 with the continuously curved downward top surface 20 and the continuously curved upward top surface 16.

Referring again to the embodiment illustrated in FIGS. 4-11, it is contemplated that the various components of the high-speed blending blade 10 can have a consistent thickness throughout the length of each component. In this manner, the first and second blades 40, 42 that make up the downwardly arcuate blades 18 or the downward blade portion can define a continuously curved convex blade portion 60 having a thickness of approximately 3 mm. Similarly, the third and fourth blades 44, 46 that make up the upwardly arcuate blades 14 or the upward blade portion can define a continuously curved concave blade portion 62 having a thickness of approximately 3 mm. It is contemplated that the continuously curved convex blade portion 60 and the continuously curved concave blade portion 62 can intersect at the central blade portion 22 that receives the continuously curved convex and concave blade portions 60, 62.

Referring again to the embodiment illustrated in FIGS. 4-11, the pair of opposing top blades 26 that extend from an area proximate the central top surface 24 of the high-speed blending blade 10 are configured to extend upward at the predetermined angle 28. This predetermined angle 28 can be approximately 72 degrees relative to the central top surface 24 of the central blade portion 22. It is contemplated that the opposing top blades 26 can be disposed at different angles relative to the top surface 48 of the central blade portion 22. Such angles can be as low as approximately 45 degrees or as high as approximately 90 degrees. Such angles can be determined based upon the functional needs of the high-speed blending blade 10 and the food-processing function that the high-speed blending blade 10 is intended to be used for. By way of example, and not limitation, it is contemplated that a high-speed blending blade 10 used for crushing ice may have top blades 26 that are set at a different angle than a high-speed blending blade 10 that is configured to chop vegetables, make smoothies, or other blending functionality. Similarly, the top blades 26 may be set at a predetermined angle 28 that is efficient for each of these functionalities, such that a single high-speed blending blade 10 can be used to perform a plurality of functions, without having to change the high-speed blending blade 10.

Referring again to the embodiment illustrated in FIGS. 4-11, each of the top blades 26 of the high-speed food processing appliance 12 includes an upper leading edge 80 and an upper trailing edge 82 with an inward surface 84 extending therebetween. According to the various embodiments, the upper trailing edge 82 of each of the top blades 26 is generally set at an angle substantially perpendicular to the inward surface 84 of the top blades 26. The upper leading edge 80 of each of the top blades 26 is configured to be set at a predetermined edge angle 86 relative to the inward surface 84 of the top blades 26. According to the various embodiments, the predetermined edge angle 86 of the upper trailing edge 82 of each of the top blades 26 can be within the range of approximately 40 degrees to approximately 90 degrees.

According to the various embodiments, where the upper trailing edge 82 is set at a predetermined edge angle 86 of less than 90 degrees, the upper leading edge 80 can be used to slice, chop or otherwise cut through various food items. In an embodiment where the upper leading edge 80 of the top blades 26 approaches 90 degrees, and is substantially perpendicular to the inward surface 84, the top blades 26 can be configured to crush various harder food items, such as ice, frozen foods, harder food items and other substantially solid food products. According to various embodiments, each of the upper leading edges 80 of the top blades 26 can be set at different angles substantially between 40 degrees and 90 degrees relative to the inward surface 84 of the top blades 26. In such an embodiment, the predetermined edge angle 86 of a first upper leading edge 80 can be designed to be efficient at slicing food processing functions, where a second upper leading edge 80 can be designed to be efficient at crushing food processing functions and other various food processing functions of the high-speed food processing appliance 12.

According to various embodiments, the predetermined edge angle 86 of the upper leading edge 80 can be between approximately 43 degrees to approximately 47 degrees. It is contemplated, as discussed above, that other predetermined edge angles 86 are able to be implemented within each of the top blades 26 of the high-speed blending blade 10.

According to the embodiment illustrated in FIGS. 4-11, the high speed blending blade 10 includes two opposing top blades 26. The two opposing top blades 26 can be connected by a central region 90 that engages the central blade portion 22 to substantially fix the position of the top blades 26 relative to the convex and concave blade portions 60, 62. In this manner, the central region 90 extending between the two opposing top blades 26 and the central blade portion 22 of the high-speed blending blade 10 include a connecting aperture 92 extending therethrough. The connecting aperture 92 of the high-speed blending blade 10 is used to attach the high-speed blending blade 10 to the rotating blade of the high-speed food processing appliance 12.

According to various alternate embodiments, the opposing top blades 26 can be engaged with the central blade portion 22 at areas proximate where the concave and/or convex blade portions 62, 60 engage the central blade portion 22. In such an embodiment, the top blades 26 can be integrally formed with the remainder of the high-speed blending blade 10. Alternatively, the top blades 26 can be attached to a central top surface 24 of the central blade portion 22, where such attachment can be accomplished by welding, mechanical attachments, adhesives, and other various attaching mechanisms and methods. According to the various embodiments, the top blades 26 can be aligned with the convex blade portion 60, or with the concave blade portion 62. According to various alternate embodiments, the top blades 26 can be disaligned with the concave and convex blade portions 62, 60.

Figure 6:
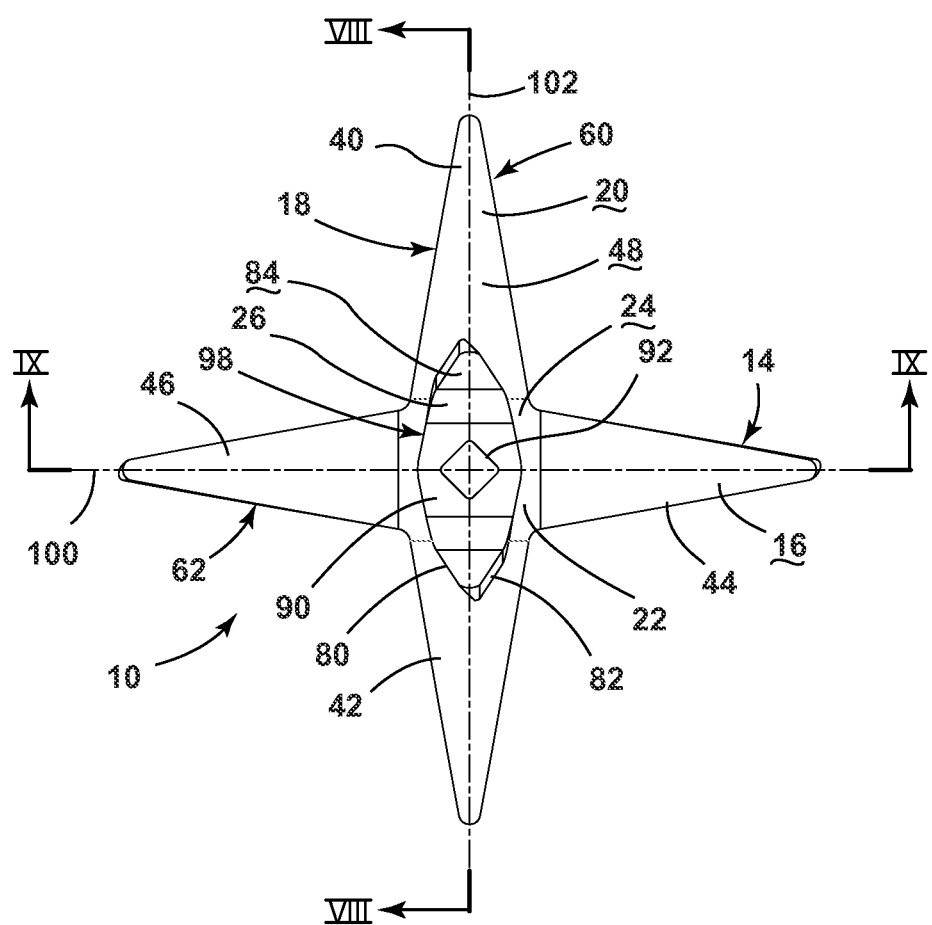
FIG. 6 is a top plan view of the high-speed blending blade of FIG. 4.
Figure 7:
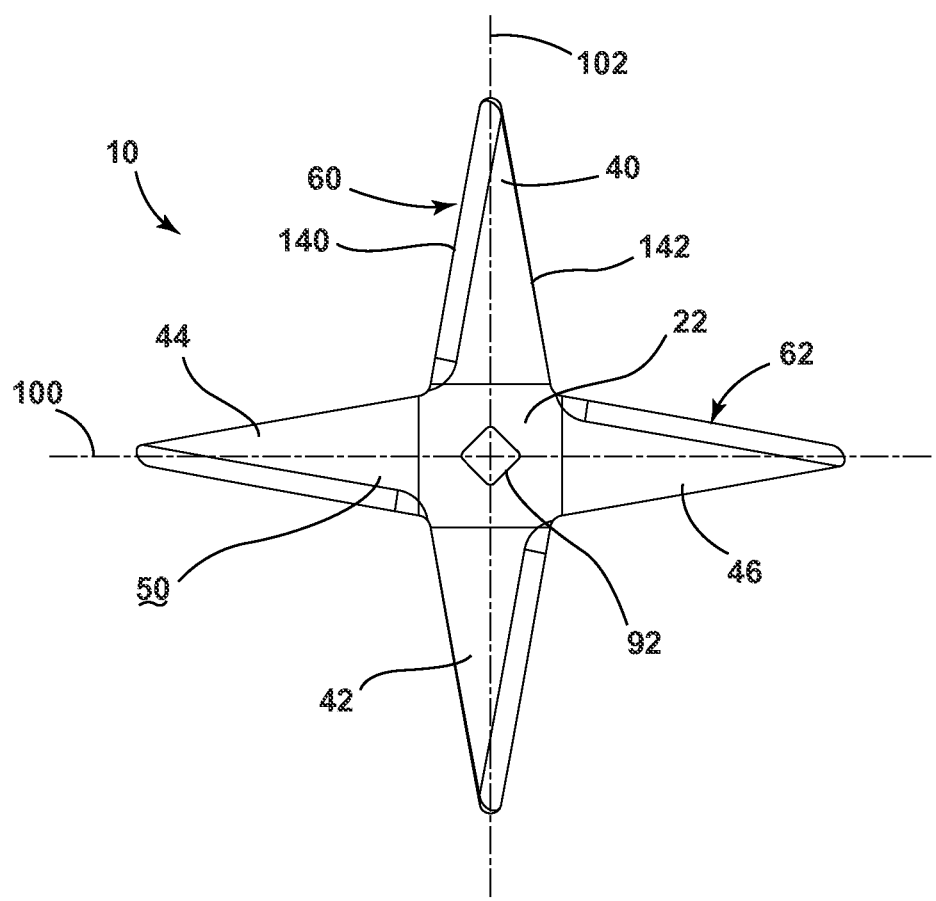
FIG. 7 is a bottom plan view of the high-speed blending blade of FIG. 4.
Figure 8:
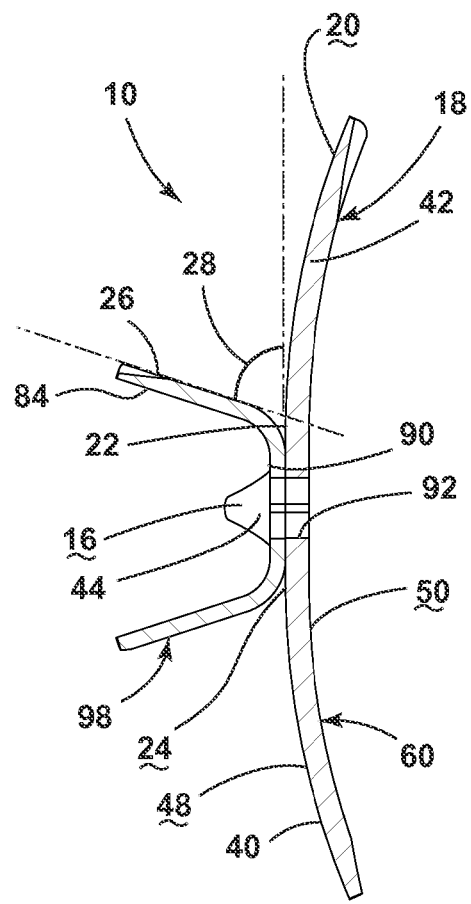
FIG. 8 is a cross-sectional view of the high-speed blending blade of FIG. 6 taken along line VIII-VIII.
Figure 9:
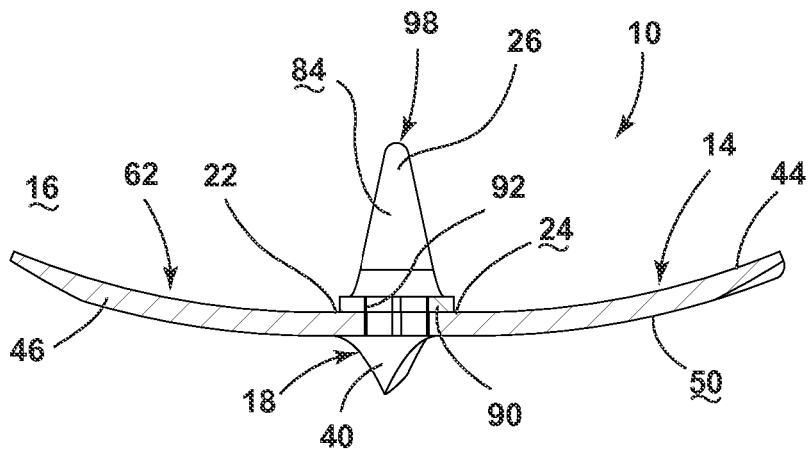
FIG. 9 is a cross-sectional view of the high-speed blending blade of FIG. 6 taken along line IX-IX.
Figure 10:
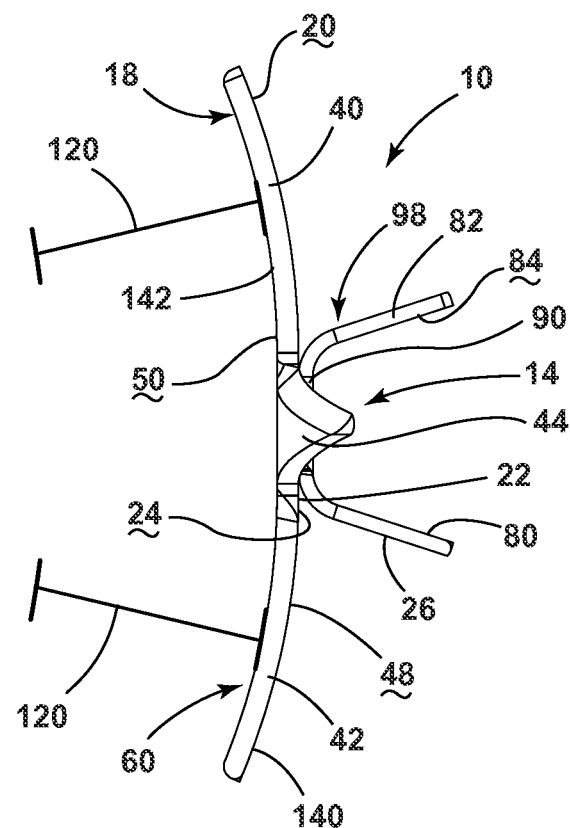
FIG. 10 is a first side elevational view of the high-speed blending blade of FIG. 4.
Figure 11:
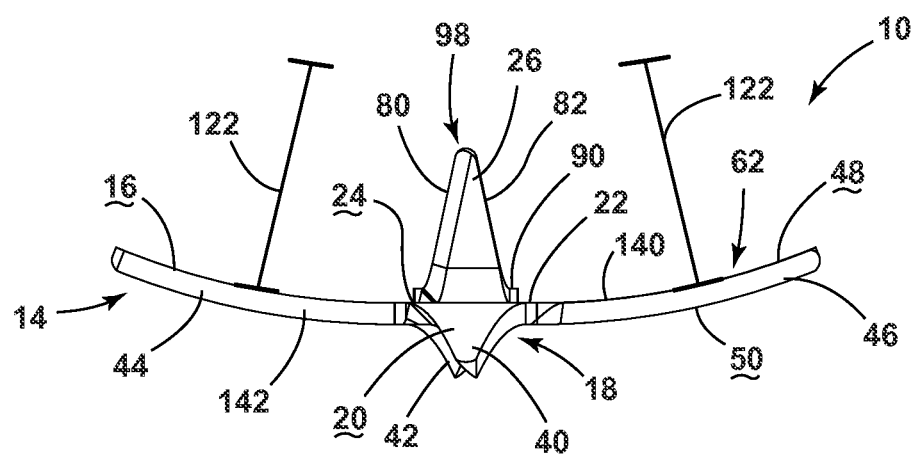
FIG. 11 is a second side elevational view of the high-speed blending blade of FIG. 4.
Figure 12:
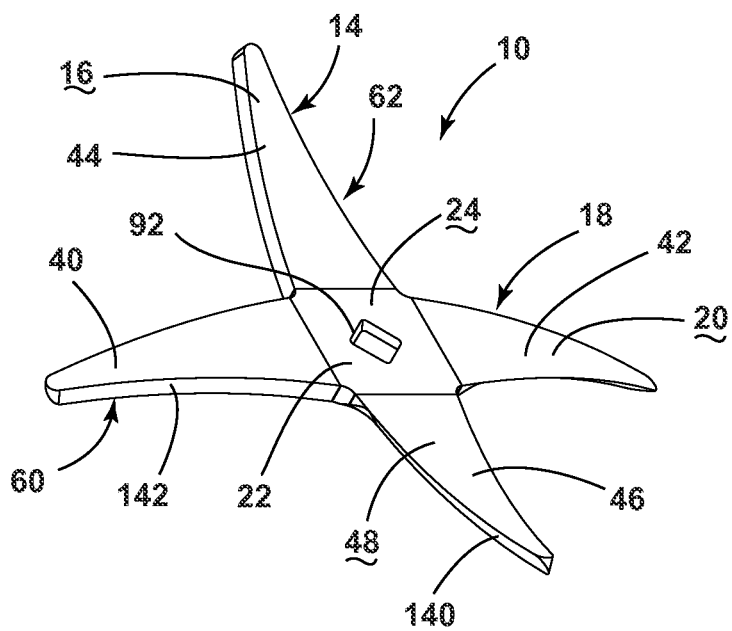
FIG. 12 is a top perspective view of another alternate embodiment of the high-speed blending blade.
Figure 13:
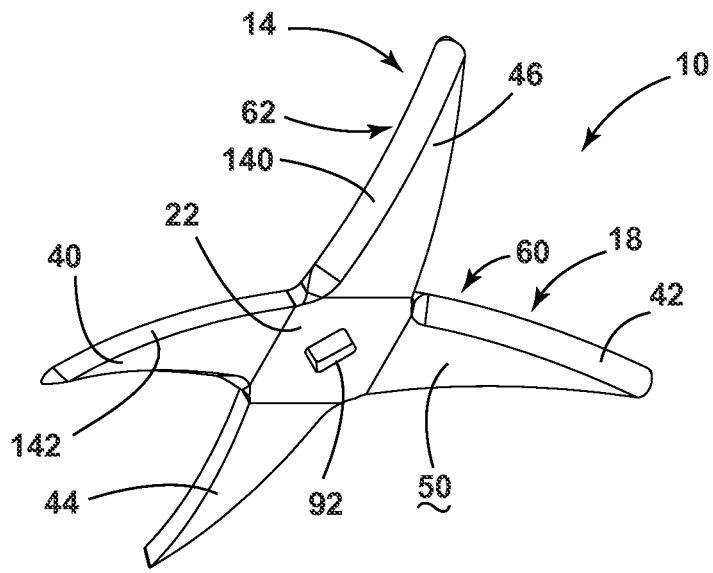
FIG. 13 is a bottom perspective view of the high-speed blending blade of FIG. 12.
Figure 14:
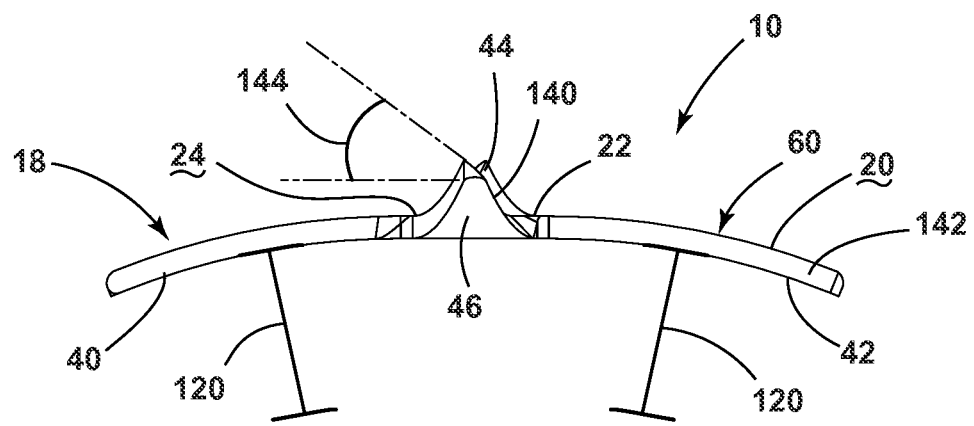
FIG. 14 is a first side elevational view of the high-speed blending blade of FIG. 12.
Figure 15:
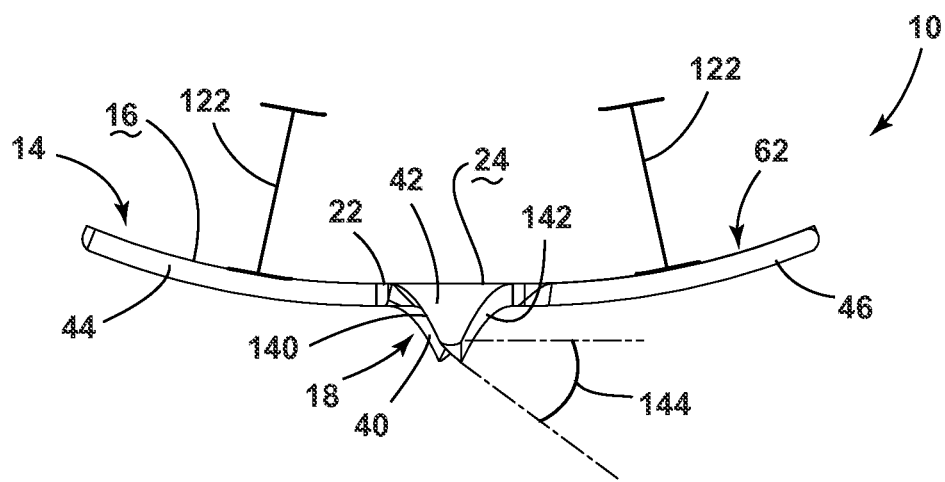
FIG. 15 is a second side elevational view of the high-speed blending blade of FIG. 12.
Figure 17:
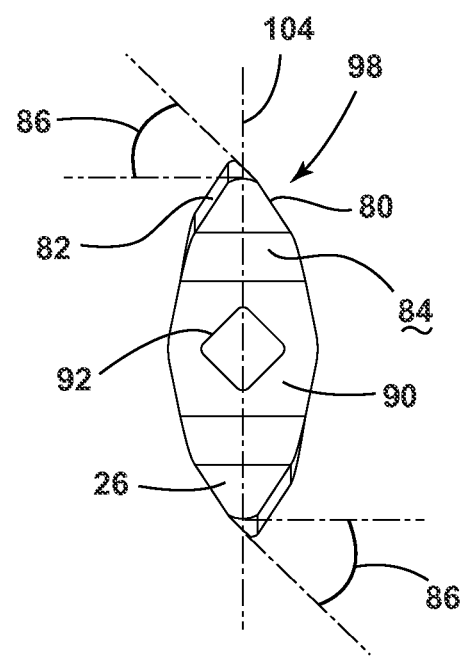
FIG. 17 is a top plan view of the top blade assembly of FIG. 16.

According to the various embodiments as illustrated in FIGS. 6 and 17, the two opposing top blades 26 can be substantially aligned with a first longitudinal axis 100 extending through the convex blade portion 60. Alternatively, the two opposing top blades 26 of the upper blade portion 98 can be substantially aligned with a second longitudinal axis 102 extending through the concave blade portion 62 of the high-speed blending blade 10. In still other alternate embodiments, the two opposing top blades 26 of the upper blade portion 98 can include an upper longitudinal axis 104 that is configured to be out of alignment with both of the first and second longitudinal axes 100, 102 of the respective convex and concave blade portions 60, 62.

Referring again to the embodiment illustrated in FIGS. 4-11, the top blades 26 of the high-speed food processing appliance 12 include two opposing top blades 26. It is contemplated that additional top blades 26 can be included within the upper blade portion 98 where three, four, or more top blades 26 can be included within the high-speed blending blade 10. It is also contemplated that in addition to the top blades 26, bottom blades, substantially similar in configuration to the top blades 26, can be included within the high-speed blending blade 10 such that the bottom blades are attached to the bottom surface 50 of the high-speed blending blade 10 and extend from an area proximate the central blade portion 22 of the high-speed blending blade 10 at a bottom predetermined angle 28 similar to that discussed above with respect to the predetermined angle 28 of the top blades 26.

Referring now to the embodiment illustrated in FIGS. 12-15, it is contemplated that the high-speed blending blade 10 can be made without the upper blade portion 98 having the two opposing top blades 26. In such an embodiment, the high-speed blending blade 10 can include the continuously curved convex blade portion 60 having a thickness of approximately 3 mm and the continuously curved concave blade portion 62 having a thickness of approximately 3 mm. Such a high-speed blending blade 10 can also include the central blade portion 22 that receives the continuously curved convex and concave blade portions 60, 62. Where the upper blade portion 98 is not included, the central blade portion 22 need not be completely planar. Accordingly, the first and second blades 40, 42 of the convex blade portion 60 and the continuously curved downward top surface 20 defined thereby can extend into the central blade portion 22. Similarly, the third and fourth blades 44, 46 of the continuously curved concave blade portion 62 that defines the continuously curved upward top surface 16 can also extend into the central blade portion 22. In this manner, the downward or convex blade portion 60 and the upward or concave blade portion 62 can intersect at a center point of the central blade portion 22, such that the concave blade portion 62 and convex blade portion 60 define two intersecting cylindrical shapes that meet at the central blade portion 22 proximate the connecting aperture 92.

According to various embodiments, it is possible for the upper blade portion 98 having the opposing top blades 26 to be installed upon a central blade portion 22 that has a curvature that extends into the concave and convex blade portions 62, 60. It is contemplated that such an upper blade portion 98 may have a central region 90 that has a curvature substantially similar to that of the central blade portion 22 such that the engagement of the central region 90 of the upper blade portion 98 and the central blade portion 22 is substantially flush such that the various debris may not become lodged between the upper blade portion 98 and the central blade portion 22 of the high-speed blending blade 10.

Referring again to the embodiment illustrated in FIGS. 12-15, it is contemplated that the first and second blades 40, 42 define a continuously curved shape where the first and second blades 40, 42 define the opposing downwardly arcuate blades 18 having continuous downward curves. Similarly, the third and fourth blades 44, 46 of the concave blade portion 62 are configured to define the opposing upwardly arcuate blades 14 that define continuous upward curves.

It is also contemplated that the curvature of the first and second blades 40, 42 in the downward direction is substantially similar to the curvature of the third and fourth blades 44, 46 in the upward direction. In this manner, the continuously curved convex blade portion 60, having the first and second blades 40, 42, extends from the central blade portion 22 along the first longitudinal axis 100. The first and second blades 40, 42 define a downward curve along this first longitudinal axis 100, where each downward curve includes a first radial length 120. Similarly, the continuously curved concave blade portion 62, which includes the third and fourth blades 44, 46, extends from the central blade portion 22 along the second longitudinal axis 102. The third and fourth blades 44, 46 each define an upward curve along the second longitudinal axis 102 where each upward curve includes a second radial length 122. It is contemplated that the first and second radial lengths 120, 122 of the first, second, third and fourth blades 40, 42, 44, 46, respectively, are substantially similar, according to various embodiments.

According to the various embodiments, it is also contemplated that the continuously curved convex blade portions 60, the continuously curved concave blade portion 62, and the central blade portions 22 of the high-speed blending blade 10 can define curved top and bottom surfaces 48, 50. In such an embodiment, each of the curved top and bottom surfaces 48, 50 at least partially define a substantially hyperbolic surface. Such a hyperbolic surface is sometimes referred to as a "saddle" curve or a hyperbolic paraboloid. These curved shapes generally reflect that the first and second blades 40, 42 of the high-speed blending blade 10 curve in a downward direction, while the third and fourth blades 44, 46 of the high-speed blending blade 10 curve in a generally upward direction. In the various embodiments, it is contemplated that the first, second, third and fourth blades 40, 42, 44, 46 of the high-speed blending blade 10 meet at the central blade portion 22 along a single horizontal plane extending through the central blade portion 22. Accordingly, during manufacture of the high-speed blending blade 10, it is contemplated that a single flat member having four substantially triangular portions extending from a central portion can be stamped, forged, bent, or otherwise manipulated into the various embodiments of the high-speed blending blade 10 disposed herein. As such, each of the triangular portions of the substantially flat piece can be manipulated into the first, second, third and fourth blades 40, 42, 44, 46 of the high-speed blending blade 10. It is further contemplated that the various components of the high-speed blending blade 10 can be made of various solid materials that can include, but are not limited to, metal, ceramic, polymers, metal alloys, combinations thereof, and other similar solid materials that can withstand various internal and external forces experienced by the high-speed blending blade 10 due to rotation at approximately 24,000 RPM, or more, while chopping or otherwise processing various food items. Regardless of the material, it is contemplated that the thickness of the various components of the high-speed blending blade 10 have a thickness of approximately 3 mm. As discussed above, the top blades 26 can include thicknesses of approximately 2 mm, in various embodiments.

Referring again to the embodiment illustrated in FIGS. 12-15, it is contemplated that each of the first, second, third and fourth blades 40, 42, 44, 46 of the high-speed food processing appliance 12 can include leading and trailing edges 140, 142 that extend between the continuously curved downward top surface 20 and the continuously curved upward top surface 16, respectively. It is contemplated that the leading edge 140 of the first, second, third and fourth blades 40, 42, 44, 46 is disposed at a blade edge angle 144 of between approximately 43 degrees and approximately 47 degrees relative to the continuously curved downward top surface 20 as to the first and second blades 40, 42, and relative to the continuously curved upward top surface 16 as to the third and fourth blades 44, 46. It is also contemplated that the trailing edge 142 of the first, second, third and fourth blades 40, 42, 44, 46 can be substantially perpendicular to the respective upward or downward top surface 20. It is also contemplated that the trailing edge 142 of each of the first, second, third and fourth blades 40, 42, 44, 46 can be disposed at an angle of less than 90 degrees. In such an embodiment, where a high-speed food processing appliance 12 has two-way food processing capabilities, the trailing edge 142 of the high-speed blending blade 10 can be used as a cutting implement when the high-speed blending blade 10 is rotated in a second direction. Alternatively, it is contemplated that in embodiments where the trailing edge 142 of the first, second, third and fourth blades 40, 42, 44, 46 is substantially perpendicular to the respective upward and downward top surfaces 16, 20, the second direction of rotation of the high-speed food processing appliance 12 can be used to perform non-cutting blending functions, such as crushing, pulse-type functions, or other primarily non-cutting food processing operations.

According to the various embodiments, the first longitudinal axis 100 along which the first and second blades 40, 42 are aligned can be substantially perpendicular to the second longitudinal axis 102 along which the third and fourth blades 44, 46 are aligned. It is contemplated that the first and second longitudinal axes 100, 102 can be oriented in a non-perpendicular configuration such that the first and second blades 40, 42 are not perpendicular with the third and fourth blades 44, 46. It is also contemplated that the high-speed blending blade 10 can include additional opposing blades such that the high-speed blending blade 10 can include fifth and sixth blades that are aligned along a third longitudinal axis. Additional opposing blades can also be included.

In various alternate embodiments, the high-speed blending blade 10 can include an odd number of individual blending members, such as first, second and third blending blades 40, 42, 44. In such an embodiment, it is possible that one or more of the blending members are not aligned with another of the first, second, third or fourth blending blades 40, 42, 44, 46 and do not share a common longitudinal axis.

Figure 16:
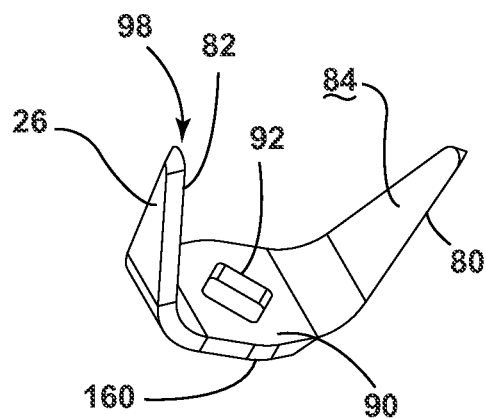
FIG. 16 is a top perspective view of an alternate embodiment of the top blade assembly for another alternate embodiment of the high-speed blending blade.

Referring now to the embodiment illustrated in FIGS. 16 and 17, it is contemplated that the upper blade portion 98 having the two opposing top blades 26 can include upper leading and upper trailing edges 80, 82 having various angles relative to the inward surface 84 of the upper blade portion 98. These upper leading and upper trailing edges 80, 82 can have angles that range from approximately 40 degrees to approximately 90 degrees relative to the inward surface 84. As discussed above, the various angles of the upper leading and upper trailing edges 80, 82 of the upper blade portion 98 can correspond to the various food processing functions intended to be implemented by the high-speed blending blade 10.

Referring again to FIGS. 16 and 17, it is contemplated that the upper blade portion 98 can be a removable member that can be placed upon the central blade portion 22 of the high-speed blending blade 10 to perform various food processing functions. In such an embodiment, it is contemplated that the central blade portion 22 and the upper blade portion 98 include cooperative and mating placement features 160 that are configured to locate the upper blade portion 98 onto the central blade portion 22 to substantially fix the upper blade portion 98 relative to the first, second, third and fourth blades 40, 42, 44, 46. In this manner, the cooperative and mating placement feature 160 of the upper blade portion 98 and the central blade portion 22 can be configured to substantially fix the upper blade portion 98 in a predetermined position.

Figure 18:
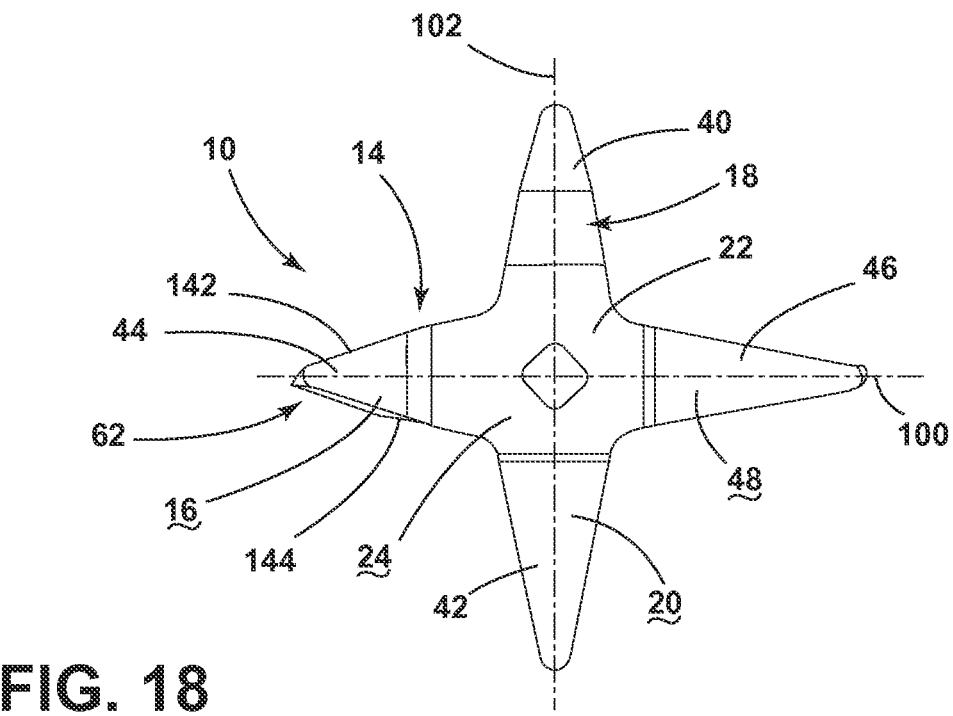
FIG. 18 is a top plan view of another alternate embodiment of the high-speed blending blade.
Figure 19:
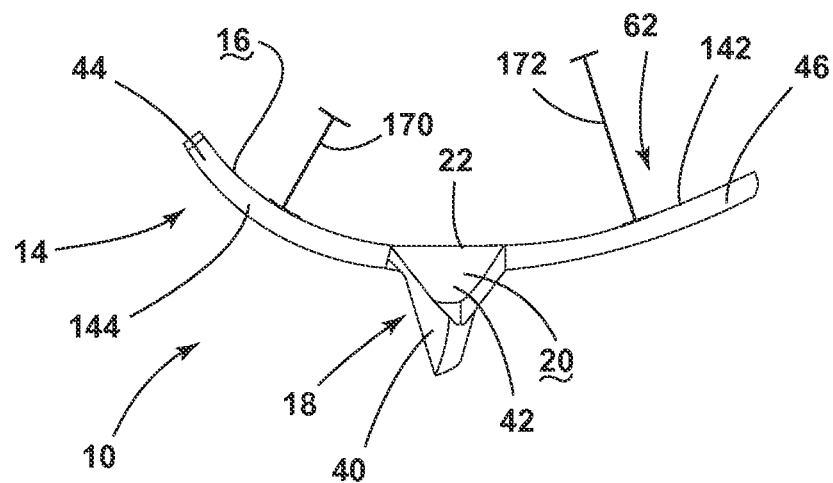
FIG. 19 is a first side elevational view of the high-speed blending blade of FIG. 18.
Figure 20:
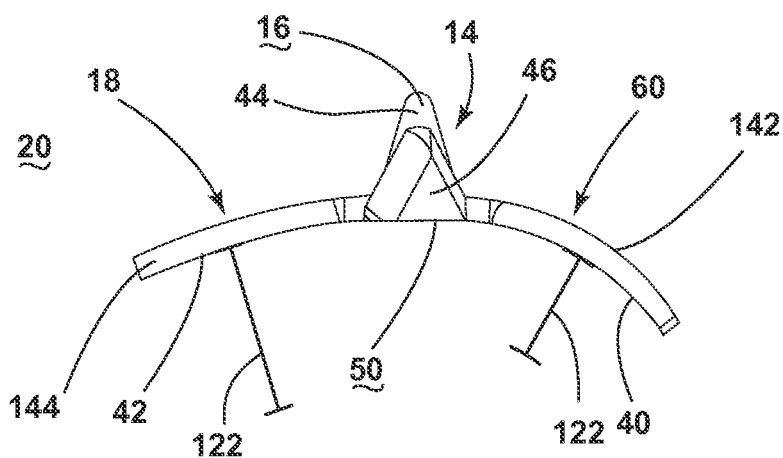
FIG. 20 is a second side elevational view of the high-speed blending blade of FIG. 18.

Referring now to the embodiment illustrated in FIGS. 18-20, it is contemplated that each of the first, second, third and fourth blades 40, 42, 44, 46 of the high-speed blending blade 10 can include a curved blade where the curve of each of the first, second, third and fourth blades 40, 42, 44, 46 has a different radial length. In such an embodiment, the curves of the first, second, third and fourth blades 40, 42, 44, 46 can have first, second, third and fourth radial lengths 120, 122, 170, 172, respectively. The first, second, third and fourth radial lengths 120, 122, 170, 172 are different. Accordingly, as the high-speed blending blade 10 is rotated, each of the first, second, third and fourth blades 40, 42, 44, 46 can have a substantially different cutting path as the high-speed blending blade 10 rotates within the food processing appliance 12. The configuration of the radial length of the curvature of each of the first, second, third and fourth blades 40, 42, 44, 46 can be determined based upon the food processing function to be implemented by the high-speed food processing appliance 12.

Figure 21:
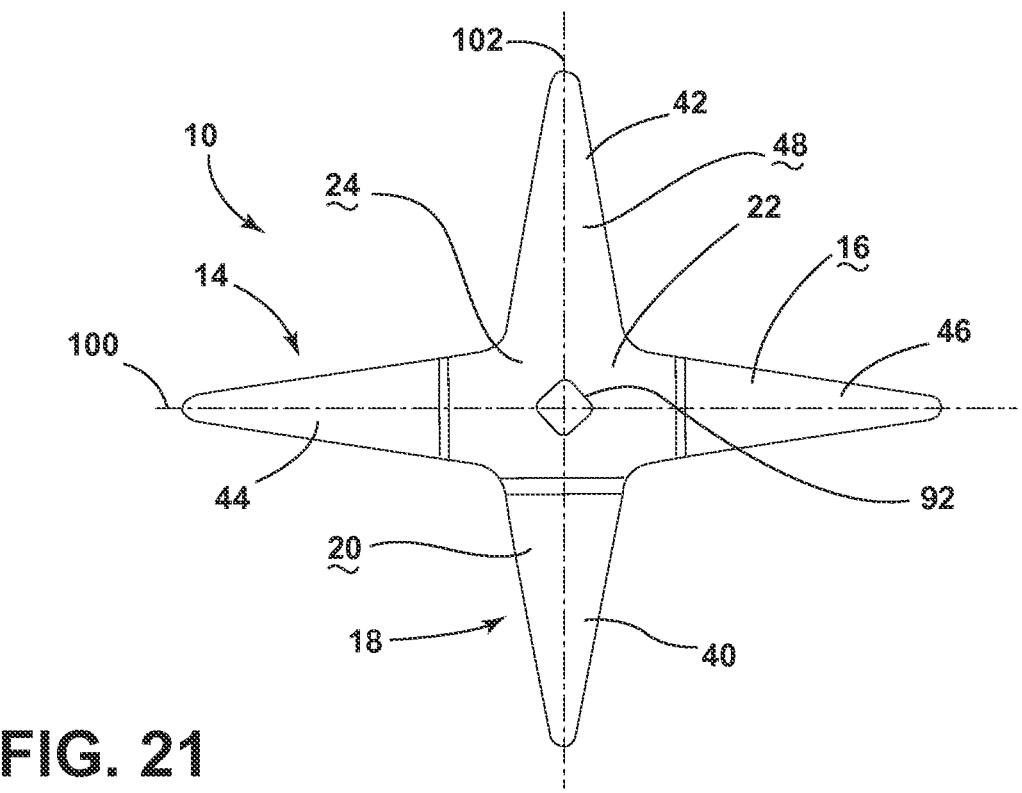
FIG. 21 is a top plan view of another alternate embodiment of the high-speed blending blade.
Figure 22:
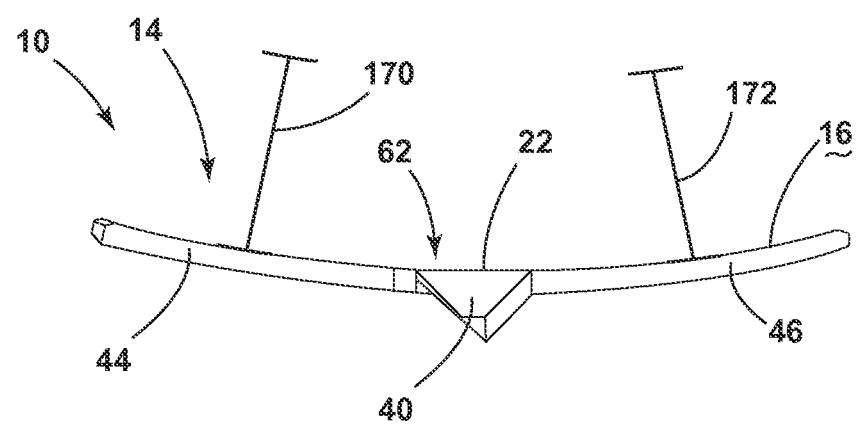
FIG. 22 is a first side elevational view of the high-speed blending blade of FIG. 21.
Figure 23:
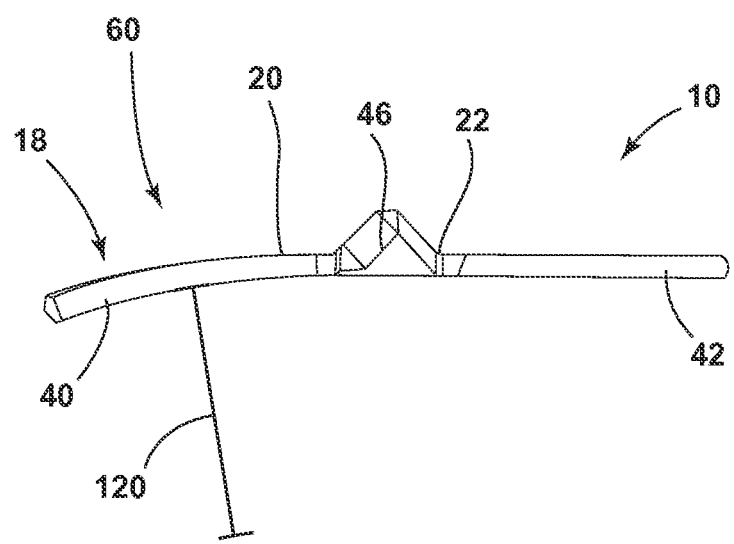
FIG. 23 is a second side elevational view of the high-speed blending blade of FIG. 21.

Referring now to the embodiment illustrated in FIGS. 21-23, it is further contemplated that at least one of the first, second, third and fourth blades 40, 42, 44, 46 can be set to be substantially co-planar with the central blade portion 22 such that one or more of the first, second, third and fourth blades 40, 42, 44, 46 and the central blade portion 22 forms a continuously planar surface. In such an embodiment, it is contemplated that each of the first, second, third and fourth blades 40, 42, 44, 46 can be set at different curves, each having a different radial length.

According to the various embodiments, the continuous curvature of the first, second, third and fourth blades 40, 42, 44, 46 creates a high-speed blending blade 10 that includes minimal angled corner portions defined within the top and bottom surfaces 48, 50 of the high-speed blending blade 10. In this manner, the lack of corners within the top and bottom surfaces 48, 50 serves to provide the high-speed blending blade 10 with a higher fatigue limit as the high-speed blending blade 10 is rotated at the speeds of approximately 24,000 RPM or more. Additionally, the continuous curvature of the first, second, third and fourth blades 40, 42, 44, 46 can provide fewer fatigue points where bending one of the blades at a particular angle to form an angle or a corner can substantially weaken that portion of a conventional blade. Accordingly, the continuous curvature of the high-speed blending blade 10 can provide a stronger blending blade. This continuous curvature in addition to the increased thickness of the high-speed blending blade 10, of approximately 3 mm, provides an overall stronger and more robust high-speed blending blade that can withstand the internal and external stresses exerted upon the high-speed blending blade 10 when rotated at approximately 24,000 RPM or more, while processing various food items.

It will be understood by one having ordinary skill in the art that construction of the described device and other components is not limited to any specific material. Other exemplary embodiments of the device disclosed herein may be formed from a wide variety of materials, unless described otherwise herein.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A high-speed blending blade for a food-processing appliance, the high-speed blending blade comprising:
   two opposing upwardly arcuate blades, wherein each of the upwardly arcuate blades defines a continuously-curved downward top surface;
   two opposing downwardly arcuate blades, wherein each of the downwardly arcuate blades defines a continuously-curved upward top surface;
   a central blade portion having a central top surface, wherein the central top surface is complementary with a portion of each downward top surface and each upward top surface; and
   a pair of opposing top blades extending at a predetermined angle from an area proximate the central top surface.

2. The high-speed blending blade of claim 1, wherein each of the upwardly arcuate blades, downwardly arcuate blades, central blade portion and top blades have a thickness of approximately 3 millimeters.

3. The high-speed blending blade of claim 1, wherein each of the top blades includes a leading edge and a trailing edge with an inward surface extending therebetween, wherein the leading and trailing edges are substantially perpendicular to the inward surface.

4. The high-speed blending blade of claim 1, wherein the top blades extend upward from proximate the central blade portion at an angle of approximately 72 degrees relative to the central top surface.

5. The high-speed blending blade of claim 1, wherein the downwardly arcuate blades are substantially perpendicular to the upwardly arcuate blades, and wherein the top blades are substantially parallel with the downwardly arcuate blades.

6. A high-speed blade for a food-processing appliance, the high-speed blade comprising:
   a downward blade portion including first and second blades, wherein each of the first and second blades define a continuous downwardly curved top surface;
   an upward blade portion including third and fourth blades, wherein the third and fourth blades define a continuous upwardly curved top surface; and a central blade portion that receives the upward and downward blade portions, wherein each continuous downwardly curved top surface and continuous upwardly curved top surface includes a transition portion that engages and is substantially co-planar with a central top surface of the central blade portion, the central blade portion having a connecting aperture.

7. The high-speed blade of claim 6, further comprising top blades extending at a predetermined angle from an area proximate the central blade portion.

8. The high-speed blade of claim 7, wherein the top blades extend upward from proximate the central blade portion at an angle of approximately 72 degrees relative to the central top surface.

9. The high-speed blade of claim 7, wherein the top blades are connected by a central region that engages the central blade portion to substantially fix a position of the top blades relative to the upward and downward blade portions.

10. The high-speed blade of claim 7, wherein the top blades include two opposing top blades.

11. The high-speed blade of claim 10, wherein the two opposing top blades are substantially aligned with a first longitudinal axis extending through the downward blade portion.

12. The high-speed blade of claim 6, wherein the first and second blades define opposing downwardly curved blades, and wherein the third and fourth blades define opposing upwardly curved blades.

13. The high-speed blade of claim 7, wherein the upward, downward and central blade portions and the top blades are made of a material having a thickness of about 3 millimeters.

14. A high-speed blending blade for a food-processing appliance, the high-speed blending blade comprising:
    a continuously curved convex blade portion having a thickness of approximately 3 millimeters;
    a continuously curved concave blade portion having a thickness of approximately 3 millimeters; and
    a central blade portion that receives the continuously curved convex and concave blade portions, the central blade portion defining a fastening aperture.

15. The high-speed blending blade of claim 14, wherein the continuously curved convex blade portion includes opposing first and second blades that extend from the central blade portion along a first longitudinal axis, wherein each of the first and second blades defines a downward curve along the first longitudinal axis, each downward curve having a first radial length, and wherein the continuously curved concave blade portion includes opposing third and fourth blades that extend from the central blade portion along a second longitudinal axis, wherein each of the third and fourth blades defines an upward curve along the second longitudinal axis, each upward curve having a second radial length, and wherein the first and second radial lengths are substantially similar.

16. The high-speed blending blade of claim 14, further comprising:
    top blades extending at a predetermined angle from an area proximate the central blade portion, wherein the top blades are made of a material having a thickness of 3 millimeters.

17. The high-speed blending blade of claim 14, wherein the continuously curved convex, continuously curved concave and central blade portions define top and bottom surfaces, wherein each of the top and bottom surfaces at least partially defines a substantially hyperbolic surface.

18. The high-speed blending blade of claim 15, wherein each of the first, second, third and fourth blades includes leading and trailing edges, wherein the leading edge is disposed at an angle of between approximately 43 degrees and approximately 47 degrees relative to a top surface of the central blade portion, and wherein the trailing edge is substantially perpendicular to the top surface of the central blade portion.

19. The high-speed blending blade of claim 16, wherein each of the top blades includes an inward surface that extends between an upper leading edge and an upper trailing edge, wherein the upper leading edge is disposed at a predetermined edge angle relative to the inward surface and the upper trailing edge is substantially perpendicular to the inward surface.

20. The high-speed blending blade of claim 19, wherein the predetermined edge angle is approximately 90 degrees.

\* \* \* \* \*